United States Patent [19]

Zürcher et al.

[11] Patent Number: 5,077,061

[45] Date of Patent: Dec. 31, 1991

[54] METHOD OF MAKING ALCOHOL-FREE OR NEARLY ALCOHOL-FREE BEER

[75] Inventors: Christian Zürcher, Eppertshausen; Rüdiger Gruss, Weiskirchen, both of Fed. Rep. of Germany

[73] Assignee: Binding-Brauerei AG, Frankfurt am Main, Fed. Rep. of Germany

[21] Appl. No.: 630,791

[22] Filed: Dec. 21, 1990

Related U.S. Application Data

[63] Continuation of Ser. No. 264,008, Oct. 27, 1988, abandoned, which is a continuation of Ser. No. 877,815, Jun. 24, 1986, abandoned.

[30] Foreign Application Priority Data

Jun. 26, 1985 [DE] Fed. Rep. of Germany ....... 3522744

[51] Int. Cl.$^5$ .......................... C12C 1/00; C12C 11/00
[52] U.S. Cl. ........................................ 426/16; 426/28; 426/29; 426/14; 426/592
[58] Field of Search .............. 426/11, 12, 13, 14, 426/15, 16, 28, 29, 37, 61, 65, 64, 592, 600; 435/93

[56] References Cited

U.S. PATENT DOCUMENTS

4,622,224  11/1986  Owades ................................ 426/16

FOREIGN PATENT DOCUMENTS

| | | |
|---|---|---|
| 151123 | 7/1902 | Fed. Rep. of Germany . |
| 242144 | 4/1909 | Fed. Rep. of Germany . |
| 624614 | 10/1932 | Fed. Rep. of Germany . |
| 890634 | 2/1943 | Fed. Rep. of Germany . |
| 2212263 | 9/1973 | Fed. Rep. of Germany . |
| 2629666 | 1/1978 | Fed. Rep. of Germany . |
| 354258 | 8/1931 | United Kingdom . |
| 976838 | 12/1964 | United Kingdom . |
| 1115461 | 5/1968 | United Kingdom . |
| 1195622 | 6/1970 | United Kingdom . |
| 1239796 | 7/1971 | United Kingdom . |
| 2021146 | 11/1979 | United Kingdom . |

OTHER PUBLICATIONS

"Brewing", in the *Encyclopedia of Chemistry, Second Edition*, edited by George L. Clark, pp. 150-151 (Reinhold 1966).

*Primary Examiner*—Marianne Cintins
*Attorney, Agent, or Firm*—Spencer & Frank

[57] ABSTRACT

A method of producing an alcohol-free or low alcohol beer comprising thermally breaking malt draff to obtain a malt draff mash from a substrate selected from the group consisting of a full- or a high-alcohol content beer brewing base or a protein fraction obtained from malt draff by digesting, boiling or autoclaving during the production of edible draff meal in a draff mash. The method homogenizes, extrudes and mechanically removes insoluble chaff from the brewing base prior to thermally breaking up the malt draff, cooling the malt draff mash to about 72° C., emzymatically breaking up the malt draff mash by adding coarsely ground malt, heating the mash to 80°-85° C., adding thereto coarsely ground malt premashed in cold water to produce a wort with a final fermentation degree of at most 60% and a temperature of 70°-74° C., which is maintained until iodine normality is attained and subjecting the iodine normal mash to mashing.

21 Claims, No Drawings

5,077,061

METHOD OF MAKING ALCOHOL-FREE OR NEARLY ALCOHOL-FREE BEER

This application is a continuation of application Ser. No. 07/264,008, filed Oct. 27, 1988, now abandoned, which is a continuation of application Ser. No. 06/877,815, filed June 24, 1986, now abandoned.

BACKGROUND OF THE INVENTION

1. Field of the Invention

Alcohol-free and alcohol-reduced beverages have lately become of increased technological and economic interest; Amongst them alcohol-free and low alcohol beers have a special place because the consumer expects them to be completely comparable in taste with regular beer, except for the reduced or almost completely missing alcohol content. The interest of consumers in such alcohol-free or low alcohol beer is mainly based on the increased concern with the high caloric content of beer, the increasingly restrictive traffic laws regarding blood alcohol content, as well as the prohibition of alcohol consumption in factories and shops caused by labor protection laws.

2. Description of the Prior Art

The production of alcohol-free or low alcohol beer in accordance with a number of methods has long been known in the brewing business. However, the main problem in the production of such beer to-date has been the achievement of as close as possible a taste for alcohol-free or low alcohol beer which is equivalent to that of regular beer. This could not be achieved by any of the methods so far published.

Refreshing drinks, such as alcohol-free refreshing drinks made from beer wort by lactic fermentation (see German patents 151 123 and 22 12 263) or the one made from brewer's grain according to German patent 8 90 634 cannot be considered complete beer substitutes since their flavor is totally different from that of beer.

The same holds for the methods of German patents 2 42 144 and 6 24 614, wherein nectar yeast or yeast cultivated from fruits are used and fermented.

Next to the question of alcohol content of the beer the question of flavor plays a deciding role. The above mentioned methods aim to maintain the ratio between fermentable and non-fermentable extract in the finished beer as low as possible in order to deprive the finished beer of the unwanted beer wort-like flavor and disagreeable sweetness. Especially in the methods in which fermentation is stopped this goal has not yet been achieved to the fullest satisfaction, which can also be seen from the efforts to remove alcohol from regular beer afterwards.

SUMMARY OF THE INVENTION

The method according to the present invention takes the route of producing part of the non-fermentable extract from malt grain. This malt grain extract is furthermore very highly foamy and increases the duration of the foam of the alcohol-free or alcohol-reduced beer thus produced considerably. The malt grain extract may be a protein fraction produced from malt grain during production of edible draff meal from a draff mash.

DESCRIPTION OF THE PREFERRED EMBODIMENTS

If natural hops or hops extract extracted by means of organic solvents is boiled in the wort in order to make the beer bitter and fermentation of this wort is stopped at any time to limit the alcohol content, such beers are always rejected as too wort-like in flavor.

Natural hops or hops extract therefore cannot at all or only in small amounts be boiled with the wort, so as to avoid wort flavor in the beer.

Except for the addition of iso-$\alpha$-acids to the finished beer, not permitted by the beer tax law (purity law), the problem of the best method for supplying the wort with hops while avoiding a wort-like flavor in the finished beer thus arises.

Accordingly, the invention relates to a method for the production of alcohol-free or low alcohol beer by means of which a beer can be produced which constitutes a complete substitute for regular beer and has a similar flavor and other remaining physical and chemical properties, with the exception of the alcohol content.

This is achieved by means of the method related in the patent claim.

The invention is further explained by the following example.

EXAMPLE

An alcohol-free draft beer was produced by the method of the invention under the following conditions:

Malt Fill

Step 1

Boil draff from 3,500 kg malt in 55 hl pure water and cool to 52° C. by recirculation and addition of 50 hl cold water.

Step 2

Add mash from 650 kg coarsely ground malt to 16 hl of cold water.
Temperature of the mash: 48° C.

Step 3

Add mash of 1,950 kg coarsely ground malt to the grain mash which is at 80° C.
Resulting temperature of the total mash: 72° C.

Addition of hops

Step 4

5 kg $\alpha$ 40 as $CO_2$ extract, that is 5 kg of $CO_2$ extracted hops, which contain 40% alpha acids. Therefore 5 kg of hops extract contains two kilograms of pure alpha acid.
Boiling time of the wort: 120 min.
Resulting amount of wort: 260 hl.

The following is the result of an analysis of the alcohol-free draft beer produced by the invention:

| | |
|---|---|
| Apparent extract, % | 6.4 |
| Actual extract, % | 6.6 |
| Alcohol, % | 0.46 |
| Content of wort stock, % | 7.5 |
| Apparent extract, final fermentation, % | 3.2 |
| pH value | 4.55 |
| Color EBC | 7.6 |
| Carbon dioxide content, % | 0.53 |
| Bitters units, EBC | 33.0 |
| Foam retention, R and C | 130 |
| Glucose, g/100 ml | 0.2 |
| Fructose, g/100 ml | 0.1 |
| Saccharose, g/100 ml | 0.1 |
| Maltose, g/100 ml | 2.6 |
| Malt triose, g/100 ml | 0.5 |
| Ethyl acetate, mg/l | 3.1 |

-continued

| | |
|---|---|
| Isoamyl acetate, mg/l | 0.25 |
| Ethyl caproate, mg/l | 0.03 |
| Ethyl caprylate, mg/l | 0.05 |
| 2-phenyl ethyl acetate, mg/l | 0.02 |
| Isobutanol, mg/l | 1.1 |
| Isoamyl alcohols, mg/l | 13.7 |
| 2-phenyl ethyl alcohol, mg/l | 3.6 |
| Caprylic acid, mg/l | 6.2 |
| Di-methyl sulfide, y/l | 42.0 |
| Vicinal di-ketones, mg/l | 0.11 |

We claim:

1. A method of producing low-alcohol or alcohol-free beer, comprising steps for:
   preparing a malt grain mash from a full-alcohol or high-alcohol beer brewing base,
   separating insoluble chaff from said malt grain mash,
   boiling said mash for a period of time sufficient to thermally decompose said malt grain,
   cooling said mash to about 72° C. to produce a wort,
   adding hops, and
   fermenting said wort with yeast to produce a low-alcohol or alcohol-free beer.

2. The method set forth in claim 1, wherein said malt grain mash comprises a protein fraction produced from malt grain.

3. The method set forth in claim 1, wherein said wort is fermented by adding a second mash of coarsely ground malt containing from about 10% to about 30% by weight as much malt grain compared to the malt grain mash of claim 1.

4. The method set forth in claim 1, wherein said wort is fermented to a maximum final fermentation degree of 60%.

5. The method set forth in claim 1, wherein said fermentation is stopped by inactivating or separating said yeast.

6. The method set forth in claim 1, wherein said low-alcohol or alcohol-free beer is cooled, followed by storing said cooled beer for at least 14 days, and removing impurities from said cooled beer.

7. The method set forth in claim 1, wherein said low-alcohol or alcohol-free beer is pasteurized.

8. The method of claim 5, wherein
   the step of inactivating is conducted by separating solids from a liquid fraction of the wort.

9. The method of claim 8, wherein
   the separation of the solids from the liquid fraction of the wort is by filtration.

10. The method of claim 5, further comprising
    storing the inactivated beer for a period of time of at least 14 days at a temperature of about the freezing point of the beer to allow the separation of a residue, and
    removing said residue.

11. The process of claim 10, further comprising
    bottling the residue-free beer, and
    pasteurizing the bottled beer.

12. The method of claim 10, further comprising
    heating the residue-free beer, and
    bottling the beer at a temperature of at least about 60° C.

13. The method of claim 4, wherein
    the step of fermenting said draft beer wort is conducted under $CO_2$ counterpressure for a period of time effective to obtain a low-alcohol beer having an alcohol content greater than about 0.5% and less than or equal to about 1.5%.

14. The method of claim 13, further comprising
    inactivating yeast contained in the beer.

15. The method of claim 14, wherein
    the step of inactivating is conducted by heating the beer under conditions and for a period of time effective to inactivate the yeast in the wort.

16. The method of claim 14, wherein
    the step of inactivating is conducted by separating solids from a liquid fraction of the wort.

17. The method of claim 16, wherein
    the separation of the solids from the liquid fraction of the wort is conducted by filtration.

18. The method of claim 14, further comprising
    storing the inactivated beer for a period of time of at least 14 days at a temperature about the freezing point of the beer to allow the separation of a residue, and removing the residue.

19. The process of claim 18, further comprising
    bottling the residue-free beer, and
    pasteurizing the bottled beer.

20. The method of claim 18, further comprising
    heating the residue-free beer, and
    bottling the beer at a temperature of at least about 60° C.

21. The method set forth in claim 1, wherein the step of boiling comprises heating by autoclaving.

* * * * *